US008107595B2

(12) United States Patent
Bizjak et al.

(10) Patent No.: US 8,107,595 B2
(45) Date of Patent: Jan. 31, 2012

(54) SUPERVISED PAGING, MESSAGING BACKGROUND MUSIC AND EMERGENCY VOICE EVACUATION SYSTEM

(75) Inventors: Brian Bizjak, Bridgewater, NJ (US); Dominic D'Souza, Howell, NJ (US)

(73) Assignee: Wheelock, Inc., Long Branch, NJ (US)

( * ) Notice: Subject to any disclaimer, the term of this patent is extended or adjusted under 35 U.S.C. 154(b) by 1222 days.

(21) Appl. No.: 11/291,700

(22) Filed: Dec. 1, 2005

(65) Prior Publication Data

US 2006/0140391 A1      Jun. 29, 2006

Related U.S. Application Data

(60) Provisional application No. 60/632,131, filed on Dec. 1, 2004.

(51) Int. Cl.
*H04M 11/00*         (2006.01)
(52) U.S. Cl. ........................... 379/52; 379/322; 340/506
(58) Field of Classification Search .................. 379/159, 379/45, 48, 322, 373.01
See application file for complete search history.

(56) References Cited

U.S. PATENT DOCUMENTS

| | | | | |
|---|---|---|---|---|
| 5,887,067 A * | 3/1999 | Costa et al. | ...................... | 381/81 |
| 6,021,177 A * | 2/2000 | Allport | ........................... | 379/48 |
| 6,535,121 B2 * | 3/2003 | Matheny | ....................... | 340/506 |
| 6,658,104 B1 * | 12/2003 | Carrion et al. | ................... | 379/48 |
| 7,428,311 B2 * | 9/2008 | Curran et al. | .................. | 340/291 |
| 2003/0012361 A1 * | 1/2003 | Yoshimura | ............... | 379/373.01 |
| 2003/0169177 A1 * | 9/2003 | Curran et al. | .............. | 340/691.4 |
| 2005/0163306 A1 * | 7/2005 | Salgueiro | ....................... | 379/322 |
| 2008/0263169 A1 * | 10/2008 | Brabec et al. | ................. | 709/206 |

OTHER PUBLICATIONS

Wheelock, combination voice systems, OSHA employee emergency alarm systems, Oct. 2004, Wheelock, 50, 1-50.*

* cited by examiner

*Primary Examiner* — Curtis Kuntz
*Assistant Examiner* — Maria El-Zoobi

(57) ABSTRACT

The present invention generally discloses a supervised paging, messaging background music and emergency voice evacuation system. In one embodiment, the system comprises at least one telephone zone controller and at least one telephone zone paging speaker splitter or addressable paging splitter. Specifically, telephone zone controller acts as a controlling authority for the routing and playback of audio in selectable zones. In cooperation with the telephone zone controller, the telephone zone paging speaker splitter is an addressable device that is capable of splitting an audio signal in different manners, e.g., in Class A mode or in Class B mode. The present system provides addressable functions that are not found in existing supervised paging, messaging background music and emergency voice evacuation system.

18 Claims, 15 Drawing Sheets

Fig. 4

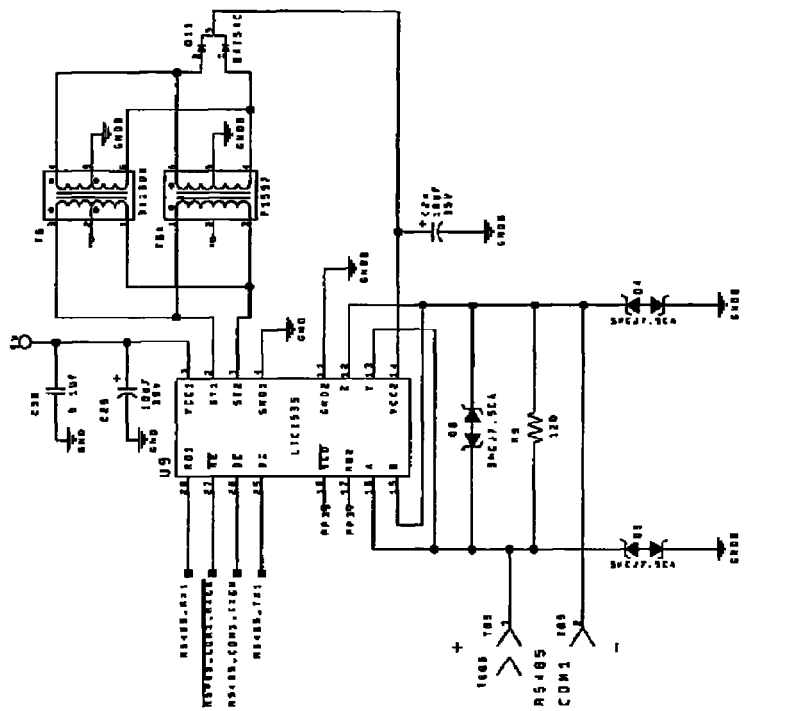
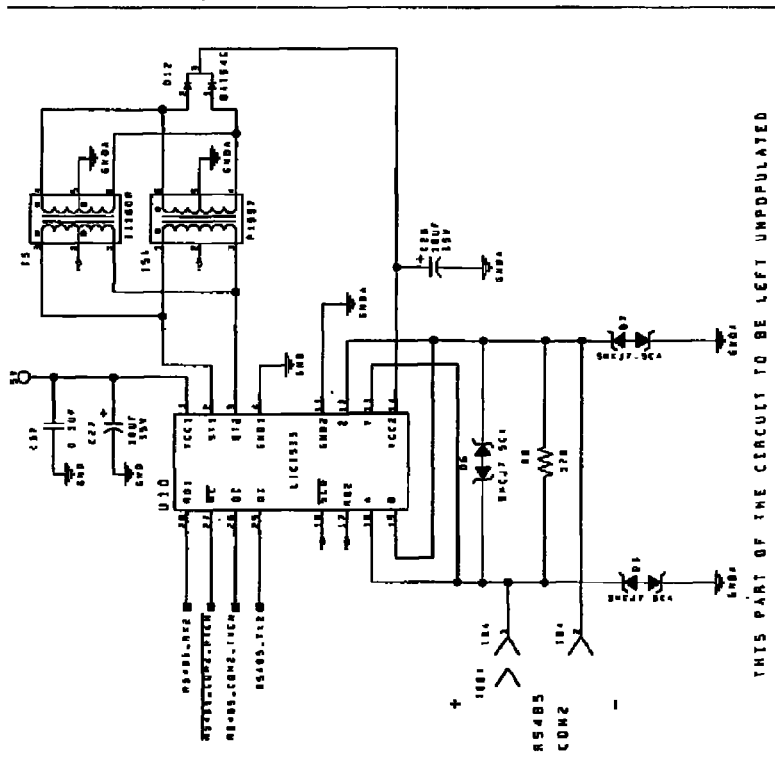
FIG. 14

SUPERVISED PAGING, MESSAGING BACKGROUND MUSIC AND EMERGENCY VOICE EVACUATION SYSTEM

This application claims the benefit of U.S. Provisional Application No. 60/632,131 filed on Dec. 1, 2004, which is herein incorporated by reference.

The present invention relates to an apparatus and concomitant method for providing an addressable notification system. More specifically, the present invention provides a notification system that allows users to control selectable paging and background music, in conjunction with voice evacuation and general paging in one system.

BACKGROUND OF THE INVENTION

Field of the Invention

An emergency voice evacuation system for a facility is often designed to drive a certain number of notification appliances, e.g., audio notification appliances, visual notification appliances and both audio and visual notification appliances. In operation, paging can be implemented into the emergency voice evacuation system as well. However, such paging function is not addressable. In other words, the paging function will broadcast the paging message over the entire emergency voice evacuation system which is impractical if the emergency voice evacuation system covers a very large area, e.g., having a large number of zones.

Thus, there is a need for a system and method for providing a supervised paging, messaging, background music and emergency voice evacuation system that is capable of providing zone addressing.

SUMMARY OF THE INVENTION

The present invention generally discloses a supervised paging, messaging background music and emergency voice evacuation system. In one embodiment, the system comprises at least one telephone zone controller (TZC or SP4-TZC) and at least one telephone zone paging speaker splitter (TZPS or SP4-TZPS or addressable paging splitter (APS or SP4-APS)). Specifically, telephone zone controller (TZC) acts as a controlling authority for the routing and playback of audio in selectable zones. In cooperation with the telephone zone controller, the telephone zone paging speaker splitter (TZPS) is an addressable device that is capable of splitting an audio signal in different manners, e.g., in Class A mode or in Class B mode. The present system provides addressable functions that are not found in existing supervised paging, messaging background music and emergency voice evacuation system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 4:
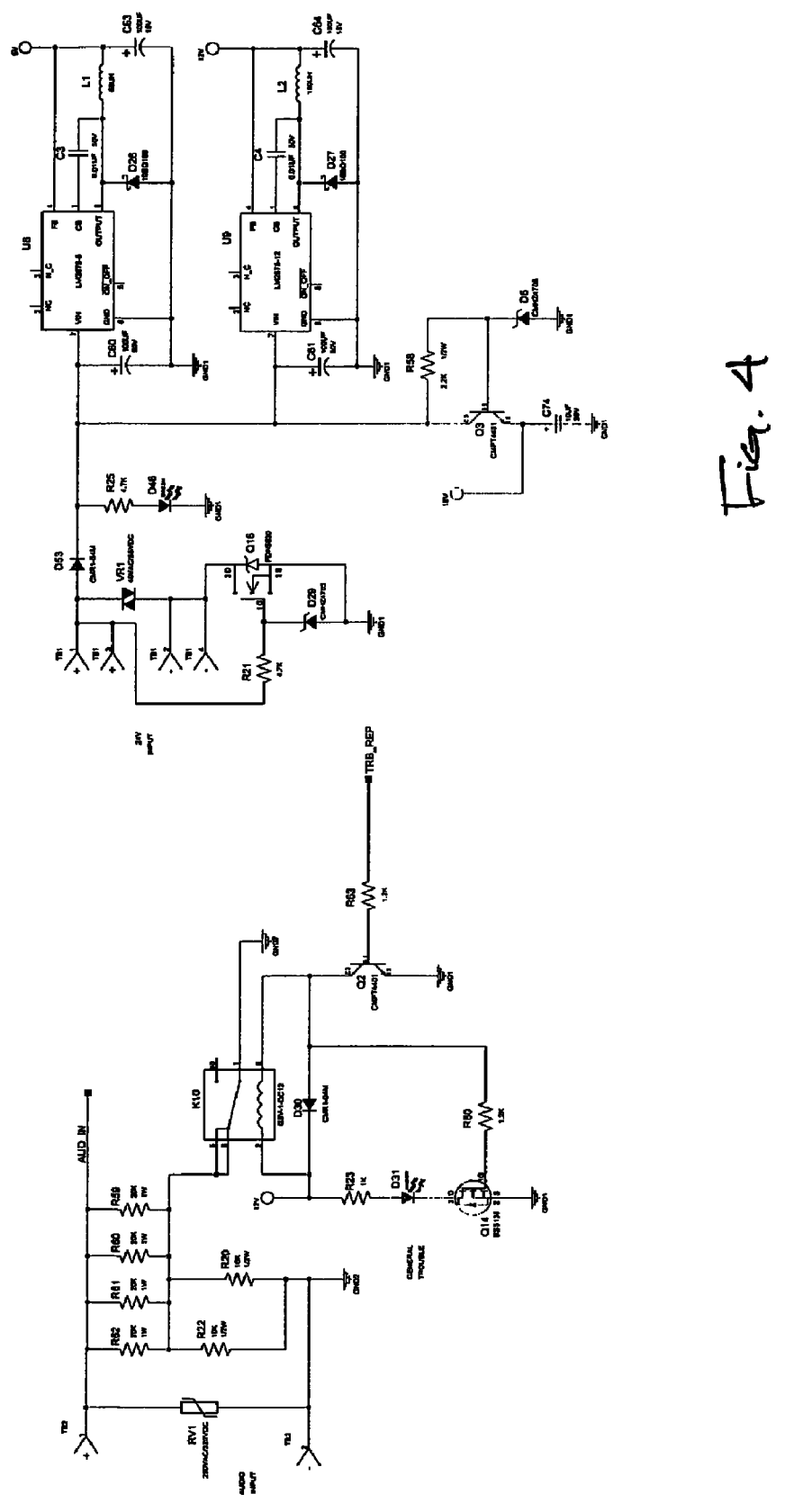

FIG. 4 is a schematic diagram of one embodiment of the present splitter showing the power and audio inputs;

FIG. 14 is a schematic diagram of one aspect of one embodiment of the present telephone zone controller.

To facilitate understanding, identical reference numerals have been used, where possible, to designate identical elements that are common to the figures.

DETAILED DESCRIPTION

The present invention generally discloses a supervised paging, messaging background music and emergency voice evacuation system. The ability to provide multiple functions to an evacuation system increases efficiency and provides additional functionalities to an existing system.

In one embodiment, the present invention is a supervised paging, messaging background music and emergency voice evacuation system with the capability of selectively addressing one or more zones. This capability to address a particular zone provides flexibility and functions that are not currently available in emergency voice evacuation system.

Figure 1:
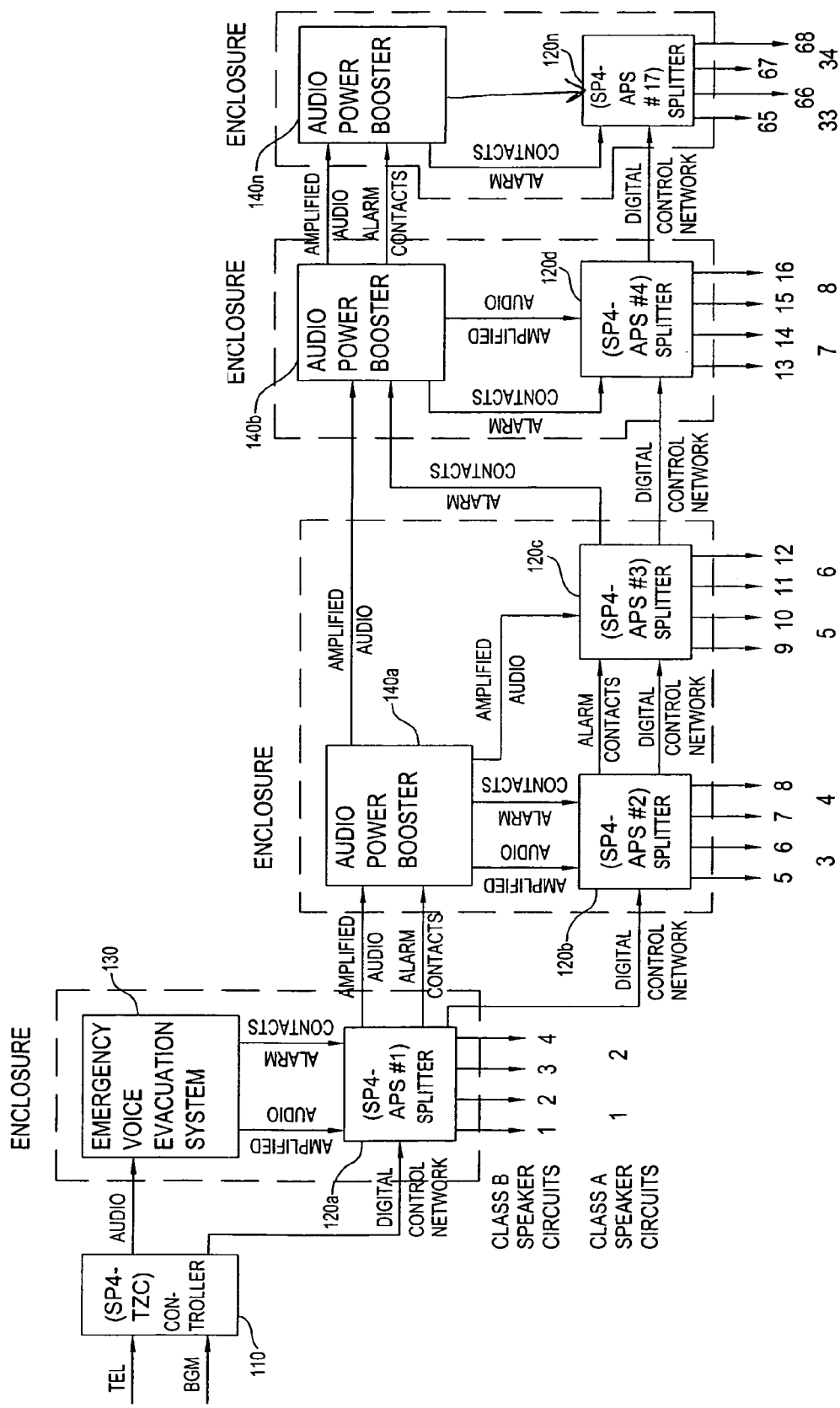
FIG. 1 is a block diagram of an exemplary supervised paging, messaging, background music and emergency voice evacuation system of the present invention.

FIG. 1 is a block diagram of an exemplary supervised paging, messaging, background music and emergency voice evacuation system 100 of the present invention. In one embodiment, the system comprises at least one telephone zone controller 110 (TZC or SP4-TZC as referred to by Wheelock Inc. of Long Branch, N.J.) and at least one telephone zone paging speaker splitter (TZPS or SP4-TZPS or addressable paging splitter (APS or SP4-APS) as referred to by Wheelock Inc.). Specifically, telephone zone controller (TZC) 110 acts as a controlling authority for the routing and playback of audio in selectable zones. In cooperation with the telephone zone controller, the telephone zone paging speaker splitter (TZPS) or addressable paging splitter (APS) is an addressable device that is capable of splitting an audio signal in different manners, e.g., in Class A mode or in Class B mode. By use of the telephone zone controller and the addressable paging splitter, the present system provides addressable functions that are not found in existing supervised paging, messaging background music and emergency voice evacuation system.

Specifically, FIG. 1 illustrates the telephone zone controller 110 interacting with a multi-function emergency voice evacuation system 130, which provides various emergency notification functions, such as generating an alarm to indicate an emergency condition and so on. In one embodiment, the multi-function emergency voice evacuation system 130 receives an audio signal from the telephone controller 110, amplifies that audio signal, and forwards the amplified audio signal to an addressable, e.g., splitter 120*a*. The addressable splitter 120*a* is capable of support a plurality of zones of notification appliances, e.g., audible, visible or audible and visible notification appliances. In one embodiment, the addressable splitter 120*a* is capable of support to Class A (e.g., 2 zones per splitter) and Class B (e.g., 4 zones per splitter) zones. It should be noted that Class A and Class B wiring is defined in accordance with the National Fire Protection Association (NFPA) 72 as Style Z wiring and Style Y wiring, respectively.

In one embodiment, the plurality of addressable splitters 120 *a-n* are deployed in a chain. Additionally, a plurality of audio power boosters 140*a-n* are deployed to provide audio amplification. FIG. 1 illustrates that one or more splitters can be deployed with one of the audio boosters or with the EVES within one enclosure, illustrated in dashed lines. However, this configuration is only exemplary.

Figure 2:
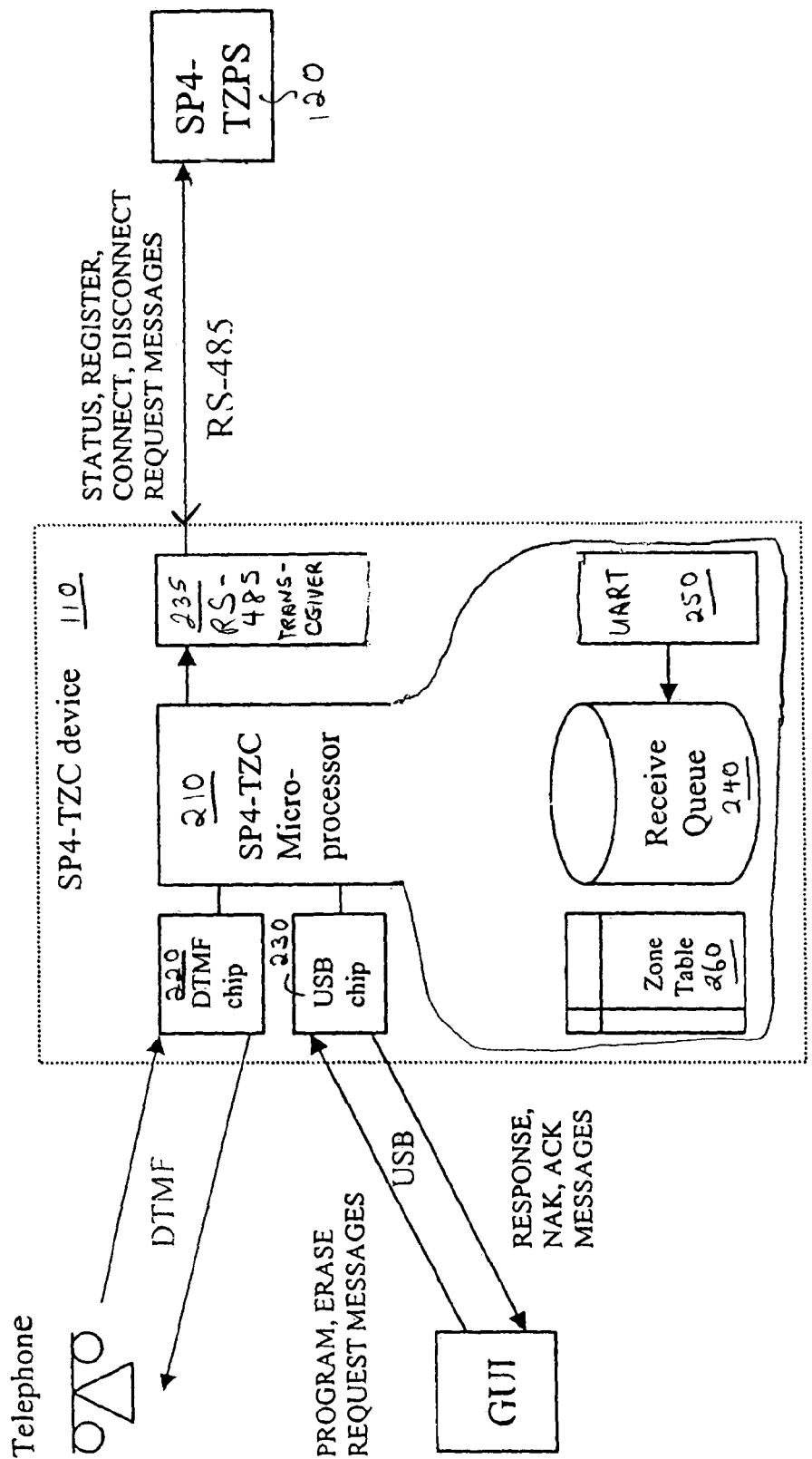
FIG. 2 is a block diagram of an exemplary telephone zone controller of the present invention.

FIG. 2 is a block diagram of an exemplary telephone zone controller 110 of the present invention. In one embodiment, the telephone zone controller is a standalone unit that acts as the controlling authority for the routing and playback of audio in zones. Namely, it interfaces with an emergency voice evacuation system and the addressable splitters to provide telephone paging and background music (BGM) in selected zones. In one embodiment, the telephone zone controller is designed to control a network comprising of a plurality of inter-connected addressable splitters in either a Class A or Class B mode of operation.

In one embodiment, the telephone zone controller 110 comprises the following hardware components:

Micro-processor 210—utilizes two serial ports.

A RS-485 235 transceiver to transmit and receive data using the dual serial ports.

DTMF chip 220—Interfaces with the micro-processor and telephone paging/CO port to convert DTMF tones to digital data.

USB chip 230—Interfaces with the micro-processor and its USB port, to send and receive data to and from the GUI.

In one embodiment, the telephone zone controller's firmware components may consist of the following software components:

Receive Queue 240—First-In First-Out (FIFO) buffer that receives and stores incoming messages addressed to the Processor.

UART 250—Software UART operating at a baud rate, e.g., of 19,200 bits per second. Allows Processor to send and receive bytes, one byte at a time.

Processor 210—Configures and controls the network of splitters in either Class A or Class B mode. Transmits Command/Request messages to addressed splitters. Checks the Receive Queue and waits for Response/Acknowledgment messages, processing them accordingly. Monitors the health of the network and provides visual notification upon the detection of a trouble condition.

Zone Table 260—Table stored in non-volatile memory, containing Logical and Background Music zone data.

Communications Protocol

In one embodiment, the telephone zone controller 110 and splitters 120*a-n* communicate via half-duplex asynchronous RS-485 serial communications. They use a proprietary Master/Slave architecture multipoint communications packet protocol that exhibits these characteristics:

1. The system will be setup in a Master/Slave configuration. Upon system initialization, the telephone zone controller sequentially assigns a virtual address to every splitter detected on the network.
2. All communication is based on conversations, and is initiated by the telephone zone controller when it sends out a command request to an addressed splitter device. Every command request issued by the master requires it to wait a certain amount of time till an acknowledged command response is received from the addressed slave device. This is similar to the Stop-and-Wait protocol. The master only communicates with one slave at a time.
3. The communication protocol and system supports message broadcasting. A Broadcast message is typically used to address all devices in the network, and usually does not require a response.
4. In the advent that a non-broadcast command request (issued by the telephone zone controller) is not acknowledged by a splitter before the telephone zone controller's command response timer has expired, or the SP4-TZPS sends a negative acknowledgement (NAK), the telephone zone controller will re-attempt to re-transmit this request twice more. After two unsuccessful re-transmissions the telephone zone controller reports trouble activity with the addressed splitter unit.
5. The following types of command requests are initiated by the telephone zone controller:
   a. Register i.e. at initialization assign virtual addresses to all slave devices;
   b. Connect to an Individual, Fixed, or Logical zone;
   c. Disconnect zone paging;
   d. Status (Heartbeat) of a slave device on the network.
6. The following types of command requests are initiated by the telephone zone controller GUI:
   a. Program—for programming a Logical or Background Music zone on the telephone zone controller;
   b. Erase—for erasing a Logical or Background Music zone on the telephone zone controller.
7. The protocol distinguishes control bytes from data bytes using the byte-stuffing approach, whereby the sending and receiving device use special character(s) to delimit the frame.
8. In order to provide reliable communications and detect data transmission errors, the communications protocol will provide some means of error detection/protection. The protocol may utilize the Cyclic Redundancy Check (CRC) method.

Data Link Packet Structure

Data Link frames or packets are of variable length and contain a header, data, and checksum section. The header may contain various pieces of Protocol Control Information (PCI) such as:

a. Prefix (PRE) byte—Indicates SOP byte to follow. Its Hexadecimal value is 0x1B or the Decimal value 27.
b. Start of packet (SOP) suffix byte—Indicates the start of a new frame. Its Hexadecimal value is 0x02 or the Decimal value 2.
c. Sequence No. (SEQ) byte—Auto wrapped sequence number. Its Hexadecimal value ranges from 0x00 to 0xFF, or the Decimal range 0 to 255.
d. Data length (LEN) byte—length of data included in the message section. Minimum data length should always be 3 bytes, while the maximum data length is restricted by code to 14 bytes for optimization purposes.

The data section carries the 'payload' i.e. the information the data link layer wishes to transfer. It comprises of N bytes, where N=LEN bytes of message data and 3<=N<=14. In one embodiment, the format for the payload section is as follows:

a. Destination Byte—Virtual Address of Destination device. The list of reserved virtual addresses are as follows:

The telephone zone controller USB Programmer is addressed by its virtual address decimal value 253.

The un-addressed splitter is addressed by its virtual address decimal value 254.

A broadcast message that is intended to address all devices has the virtual address decimal value of 255

The virtual decimal address of the telephone zone controller is 0

Splitter virtual device addresses range from decimal value 1 to n b. Source Address Byte—Source address of the sending device. Refer to the 'Destination Byte' description for the list of reserved virtual address.

c. Message Type Byte—Type of message, status, register, connect, disconnect, etc.

d. The checksum section contains the two byte Cyclic Redundancy Check (CRC) bytes:

CRC byte 1—Least Significant Byte (LSB) of a 16 bit CRC

CRC byte 2—Most Significant Byte (MSB) of a 16 bit CRC

System Initialization

All splitters must be powered-up and running before the telephone zone controller is powered-up. This is because when the telephone zone controller is powered-up, it sends important configuration information to every splitter on the network.

Take for example the following situation, whereby if a splitter has been powered up and has initialized after the telephone zone controller has started configuring the network, the splitter could have failed to receive registration information from the telephone zone controller. This situation could also prevent other splitters down the line from it, from receiving registration information. This could lead to a situation whereby some splitters may not receive their registration information, i.e., leading to an un-configured network.

Upon power-up, each splitter comes up in the T-tap network mode. If it has never been registered with the telephone zone controller, then its virtual address is set to the factory default dummy address '254'.

In one embodiment, "T-tap Mode" is the default network mode of operation on the splitter. On power up, all splitters are in T-tap Mode. T-tap mode allows messages to pass from the zone controller to all of the splitters on the network very quickly. Every single splitter in T-tap Mode will receive all messages sent from the zone controller.

It should be noted that the physical RS-485 Network topology is a daisy chain, but the logical topology is a single-ended T-Tap. All splitters will see all messages from the zone controller. If the virtual address portion of a network message is less than the virtual address of the splitter, it will ignore the message. If the virtual address portion of a network message is greater than the virtual address of the splitter and is a network message that requires a response, it will switch its RS-485 drivers and receivers to listen on its OUT port for the response and pass the message through its IN port to the telephone zone controller.

When the telephone zone controller is powered-up, it sends a Configuration request message addressed to all (previously registered as well as un-registered) devices on the network informing each device to revert to its Daisy Chain network mode. This special type of a request does not require a response back from a splitter.

In one embodiment, the splitters are wired in a daisy chain physical topology. The SP4-TZC's RS-485 OUT terminal is to be wired to the Intelligent Splitter co-located with an SP40/2's IN terminal. That Intelligent Splitter's OUT terminal is to be wired to the next Intelligent Splitter's IN terminal, etc. The maximum wiring distance between any two devices on the RS-485 network is 2000 ft. Each Intelligent Splitter's IN and OUT ports are isolated from the rest of the Intelligent Splitter's circuitry, power and ground. Because of this isolation, ground faults do not cause network communication errors.

The telephone zone controller proceeds to send out a Register message addressed to each un-addressed device (virtual address '254') on the network. When the first physically wired device from the telephone zone controller receives and processes this message, it is assigned a virtual address of '1' and sends a response back to the controller telling it what audio class mode of operation it is functioning in i.e. Class A or Class B. The controller sends out N+1 Register request messages (where N is the number of registered devices) before it times out and stops the registration process.

Finally, the controller sends a Configure request addressed to each of the N devices on the network informed each of them to revert to their T-tap network mode of operation. Each device responds to this request with a response confirming that they have received the message. The controller has now finished discovering and setting up the network of splitter devices.

If background music is setup for the system, the telephone zone controller proceeds to send out a connect request to each device that is programmed for background music. A device responds to its request by sending a connect response indicating that it has successfully or unsuccessfully connected the required zones for background music.

Once background music has been setup, the telephone zone controller sits in a never ending loop, periodically sending Status requests to every device on the network. Each device responds to this message by sending a Status response containing state data.

USB Interface

The telephone zone controller comes equipped with a USB port for connection to a computer, e.g., a laptop, that has its GUI configuration software loaded on it. The administrator uses the GUI to setup the following:

Logical zones

Background Music zone

Dynamic System Programming: Once a configuration is uploaded by the SP4 Telzone Programmer, validated for errors and stored in the SP4-TZC, the network is immediately programmed in seconds, without the need for a system reboot.

Once the administrator has setup the Logical zones and Background Music zone, and clicks the 'Save' button followed by the 'Upload' button on the GUI, a plurality of messages are sequentially sent to the splitter. Each message carries information pertaining to the setup of Logical zones 91 through 99. The last message carries information pertaining to the setup of the Background Music zone. The splitter receives each message, processes it, stores the data pertaining to each zone internally amongst its data structures and sends an acknowledgment message to the GUI.

At the GUI application level, the data section consists of the following bytes:

a. Destination Address (TO) byte—unique virtual address of the telephone zone controller device. This is the value '0'.
b. Source Address (SRC) byte—unique virtual address of the GUI.
c. Function Code (FC) byte—contains the value 'PROGRAM' or 'ERASE'. The telephone zone controller is instructed to be ready to receive and copy the accompanying data, and to perform the necessary task accordingly.
d. Zone (ZONE) byte—contains the unique Logical zone number 91-99, or Background Music zone.
e. Zones (ZONESn) bytes—this field contains the zone numbers (up to five in the case of a Logical zone) that the Logical or Background Music Zone shall be programmed with. One byte per Individual or Fixed zone number To illustrate:

Example 1

In our previous example to program the Logical zone 91 to include the Individual zones 01, 30, 68, and Fixed zones 71 and 87 the GUI transmits a packet containing the following bytes:

PRE|SOP|SEQ=0|LEN=9|TO=SP4_TZC_ADDR=0|SRC=GUI_ADDR|FC=PROGRAM|ZONE=91|ZONES1=01|ZONES2=30|ZONES3=68|ZONES4=71|ZO NES5=87|CRC1|CRC2

The SP4-TZC acknowledges this request by sending an ACK response containing the following bytes:

PRE|SOP|SEQ=0|LEN=3|TO=GUI_ADDR|SRC=SP4_TZC_ADDR=0|ACK|C RC1|CRC2

Example 2

In our previous example to program Background Music to include the Individual zones 01 and 68, and Fixed zones 71 and 87, and Logical zones 91 and 98 the GUI transmits a packet containing the following bytes:

PRE|SOP|SEQ=1|LEN=10|TO=SP4_TZC_ADDR=0|SRC=GUI_ADDR|FC=PROGRAM|ZONE=99|ZONES1=01|ZONES2=68|ZONES3=71|ZONES4=87|ZONES5=91|ZONES6=98|CRC1|CRC2

The SP4-TZC acknowledges this request by sending an ACK response containing the following bytes:

PRE|SOP|SEQ=1|LEN=3|TO=GUI_ADDR|SRC=SP4_TZC_ADDR=0|ACK|C RC1|CRC2

Telephone Zone Paging

In one embodiment, paging is initiated by keying in the double-digit zone number in the range 01-99. For example, to page Logical zone 99 would require the following input sequence: 99

Splitter Interface

The telephone zone controller interfaces with the splitter via a half-duplex serial communication that adheres to the RS-485 standard for serial transmissions.

A list of exemplary message Function Codes are shown below:

| Function Code | Description |
| --- | --- |
| 0 | STATUS - This message type is also known as the Heartbeat. It requests the status of a device on the network and is used to monitor the status of the communication links. |
| 1 | REGISTER - Set the addressed device's virtual address and registers it with the SP4-TZC controlling authority. |
| 2 | CONNECT - Setup telephone zone paging to connect to one or more zones off a SP4-TZPS. |
| 3 | DISCONNECT - Disconnect telephone zone paging in progress |
| 4 | CONFIGURE - Configure a SP4-TZPS in either a Daisy chain or t-tap mode |

Message Types

STATUS Message: At the application level, the format of a STATUS message is as follows:

a. Destination Address byte—unique virtual address of the slave splitter device
b. Source Address byte—unique virtual address of the master telephone zone controller device i.e. zero
c. Function Code byte—describes the function the slave should perform. In this case, to report status back to the telephone zone controller controlling authority.

Example

The SP4-TZC periodically transmits a heartbeat message to check the status of every SP4-TZPS on the network. The contents of the Heartbeat message consists of the following bytes:

PRE|SOP|SEQ=2|LEN=3|TO=4|SRC=SP4_TZPC_ADDR=0|FC=STATUS|CRC1|CRC2

The addressed splitter acknowledges this request by sending a status response containing the following bytes:

PRE|SOP|SEQ=2|LEN=3|TO=SP4_TZPC_ADDR=0|SRC=4|DEVICE_STATES|ZONE_STATE|EXPANSION_ZONE_STATES|CRC1|CRC2

DEVICE_STATES—A byte of device data, where bits 0 and 1 represent the states of alarm contact 1, bits 2 and 3 represent the states of alarm contact 2, bits 4 and 5 represent the states of the RS485 IN port, and bits 6 and 7 represent the states of the RS485 OUT port. Alarm contacts state definitions for the dual state data bits 0, 1 and 2, 3 are as follows:

a. ALARM NORMAL—No alarm wire trouble or active condition active exists with the alarm contact. Hex value 0x0, or decimal value 0.
b. ALARM TROUBLE—Alarm wire short or open trouble condition exists with the alarm contact. Hex value 0x1, or decimal value 1.
c. ALARM_ACTIVE—Alarm contact is reporting an active. Hex value 0x2 or decimal value 2.

RS485 port state definitions for the dual state data bits 4, 5 (IN Port) and 6, 7 (OUT Port) are as follows:

a. NORMAL—Port is successfully communicating and receiving heartbeat message from the master. Hex value 0x0, or decimal value 0.
b. RS485_TROUBLE—Port has not witnessed a heartbeat from the master and senses a communication or wiring problem. Hex value 0x03 or decimal value 3.

ZONE_STATE—A byte of zone data, where bits 0 and 1 represent zone 1, bits 2 and 3 represent zone 2, bits 4 and 5 represent zone 3, and bits 6 and 7 represent zone 4. Zone state definitions for the dual state data bits are as follows:

a. NORMAL—No zone wire trouble exists with the zone. Hex value 0x0, or decimal value 0.
    b. ZONE MINOR SHORT—Zone wiring is minor shorted. Hex value 0x1, or decimal value 1.
    c. ZONE OPEN—Open condition exists on the zone wiring. Hex value 0x2 or decimal value 2.
    d. ZONE MAJOR SHORT—Zone wires are major shorted. Hex value 0x3 or decimal value 3.

EXPANSION_ZONE_STATES—A byte of data where bits 0 and 1 represent the first expansion zone (audio zone 5) and bits 2 and 3 represent the second expansion zone (audio zone 6). Expansion zone state definitions for the dual state data bits are as follows:

a. NORMAL—No expansion zone wire trouble exists with the zone. Hex value 0x0, or decimal value 0.
    b. ZONE MINOR SHORT—Expansion zone wiring is minor shorted. Hex value 0x1, or decimal value 1.
    c. ZONE OPEN—Open condition exists on the expansion zone wiring. Hex value 0x2 or decimal value 2.
    d. ZONE MAJOR SHORT—Expansion zone wires are major shorted. Hex value 0x3 or decimal value 3.

REGISTER Message

In a network of un-registered (un-configured) splitters, each has its virtual address set to a 'dummy' value of 254. At the application level, the format of a REGISTER message is as follows:

a. Destination Address byte—unique virtual address of the slave splitter device
    b. Source Address byte—unique virtual address of the master telephone zone controller device i.e. zero
    c. Function Code byte—describes the function the slave should perform. In this case, to register the splitter with the telephone zone controller.
    d. Address byte—contains the new virtual address of the splitter.

Example

In this example the telephone zone controller sends out a Registration Request (RRQ) to register and configure a splitter on the network. Contained within the RRQ message is the device's new virtual address. The contents of the Register message that the telephone zone controller sends during system initialization to register every splitter on the network consists of the following bytes:

PRE|SOP|SEQ=3|LEN=3|TO=DUMMY_ADDR=254|SRC=SP4_TZPC_ADDR=0|FC=REGISTER|1|CRC1|CRC2

Splitter device 1 acknowledges the RRQ message by sending a response containing the following bytes:

PRE|SOP|SEQ=3|LEN=4|TO=SP4_TZPC_ADDR=0|SRC=1|CLASS_B|MAJOR_VERS|MINOR_VERS|WORK_ORDER_NO|REV|BOARD_NO|CRC1|CRC2

Included in its response message is a single byte class mode of operation that the splitter is currently configured for, a single byte major software version, a single byte minor software version, and the serial number of the device which consists of the 6 digit work order number consisting of 4 bytes, 2 character revision consisting of 2 bytes, and a 3 digit board number of also 2 bytes.

CONNECT Message

At the application level, the format of a CONNECT message is as follows:

a. Destination Address byte—unique virtual address of the slave splitter device;
    b. Source Address byte—unique virtual address of the master telephone zone controller device i.e. zero;
    c. Function Code byte—describes the function the slave should perform. In this case, to setup and connect one or more zones off a splitter;
    d. ZONES byte—For a system configured in class A bit 0 represent zone 1 and bit 1 represents zone 2. In class B bits 0, 1, 2, and 3 represents zones 1 through 4. Bits 4 and 5 are unused but reserved for future use for expansion zones 5 and 6. Lastly, bit 6 signifies that the request is for setting up background music and bit 7 signifies that the request is for setting up a telephone page.

Example 1

Assume that the Logical zone group 99 is programmed with Individual zones 1, 3, 4, and 5 and Fixed zone 87. Also, assume that the network operates in a Class B mode of operation. In order to page Logical zone 99 the telephone zone controller sends three CONNECT messages:

CONNECT message 1
    PRE|SOP|SEQ=4|LEN=6|TO=1|SRC=SP4_TZPC_ADDR=0|FC=CONNECT|ZONES=0x8D|CRC1|CRC2

After splitter device 1 has successfully setup paging capability in its zones, it acknowledges the CONNECT request by sending a response containing the following bytes:
    PRE|SOP|SEQ=4|LEN=3|TO=SP4_TZPC_ADDR=0|SRC=1|FC=CONNECT|ZONES=0x8D|CRC1|CRC2

CONNECT message 2
    PRE|SOP|SEQ=5|LEN=4|TO=2|SRC=SP4_TZPC_ADDR=0|FC=CONNECT|ZONES=0x81|CRC1|CRC2

After splitter device 2 has successfully setup paging capability in its zone, it acknowledges the CONNECT request by sending a response containing the following bytes:
    PRE|SOP|SEQ=5|LEN=3|TO=SP4_TZPC_ADDR=0|SRC=2|FC=CONNECT|ZONES=0x81|CRC1|CRC2

CONNECT message 3
    PRE|SOP|SEQ=6|LEN=4|TO=17|SRC=SP4_TZPC_ADDR=0|FC=CONNECT|ZONES=0x8F|CRC1|CRC2

After splitter device 17 has successfully setup paging capability in all its zones, it acknowledges the CONNECT request by sending a response containing the following bytes:
    PRE|SOP|SEQ=6|LEN=3|TO=SP4_TZPC_ADDR=0|SRC=17|FC=CONNECT|ZONES=0x8F|CRC1|CRC2

Example 2

Assume that the Logical zone group 91 is programmed with Individual zones 1, 4, 5, 8, and 9. Also, assume that the network operates in a Class A mode of operation. In order to page Logical zone 91 the telephone zone controller sends the following five CONNECT messages:

CONNECT message 1
    PRE|SOP|SEQ=7|LEN=4|TO=1|SRC=SP4_TZPC_ADDR=0|FC=CONNECT|ZONES=0x81|CRC1|CRC2

After the splitter device 1 has successfully setup paging capability in its zone, it acknowledges the CONNECT request by sending a response containing the following bytes:
    PRE|SOP|SEQ=7|LEN=3|TO=SP4_TZPC_ADDR=0|SRC=1|FC=CONNECT|ZONES=0x81|CRC1|CRC2

CONNECT message 2
    PRE|SOP|SEQ=8|LEN=4|TO=2|SRC=SP4_TZPC_ADDR=0|FC=CONNECT|ZONES=0x82|CRC1|CRC2

After splitter device 2 has successfully setup paging capability in its zone, it acknowledges the CONNECT request by sending a response containing the following bytes:

PRE|SOP|SEQ=8|LEN=3|TO=SP4_TZPC_ADDR=0|SRC=2||FC=CONNECT|ZONES=0x82|CRC1|CRC2

CONNECT message 3
PRE|SOP|SEQ=9|LEN=4|TO=3|SRC=SP4_TZPC_ADDR=0|FC=CONNECT|ZONES0x81|CRC1|CRC2

After splitter device 3 has successfully setup paging capability in its zone, it acknowledges the CONNECT request by sending a response containing the following bytes:
PRE|SOP|SEQ=9|LEN=3|TO=SP4_TZPC_ADDR=0|SRC=3|FC=CONNECT|ZONES=0x81|CRC1|CRC2

CONNECT message 4
PRE|SOP|SEQ=10|LEN=4|TO=4|SRC=SP4_TZPC_ADDR=0|FC=CONNECT|ZONES=0x82|CRC1|CRC2

After splitter device 4 has successfully setup paging capability in its zone, it acknowledges the CONNECT request by sending a response containing the following bytes:
PRE|SOP|SEQ=10|LEN=3|TO=SP4_TZPC_ADDR=0|SRC=4|FC=CONNECT|ZONES=0x82|CRC1|CRC2

CONNECT message 5
PRE|SOP|SEQ=11|LEN=4|TO=5|SRC=SP4_TZPC_ADDR=0|FC=CONNECT|ZONES=0x81|CRC1|CRC2

After splitter device 5 has successfully setup paging capability in its zone, it acknowledges the CONNECT request by sending a response containing the following bytes:
PRE|SOP|SEQ=11|LEN=3|TO=SP4_TZPC_ADDR=0|SRC=5|FC=CONNECT|ZONES=0x81|CRC1|CRC2

DISCONNECT Message

This message is sent to disconnected zones off a particular splitter that are currently connected for audio. At the application level, the format of a DISCONNECT message is as follows:
a. Destination Address byte—unique virtual address of the slave splitter device
b. Source Address byte—unique virtual address of the master telephone zone controller device i.e. zero
c. Function Code byte—describes the function the slave should perform. In this case, to disconnect zone paging.
d. ZONES byte—For a system configured in class A bit 0 represent zone 1 and bit 1 represents zone 2. In class B bits 0, 1, 2, and 3 represents zones 1 through 4. Bits 4 and 5 are unused but reserved for future use for expansion zones 5 and 6. Lastly, bit 6 signifies that the request is for setting up background music and bit 7 signifies that the request is for setting up a telephone page.

Example

Using example 5 as the basis to illustrate zone paging disconnection and assuming that devices with virtual addresses 6 and 7 were not involved in telephone paging but were connected and playing background music when the paging request was created, the sequence of messages that the telephone zone controller would issue would look like:

DISCONNECT message 1
PRE|SOP|SEQ=12|LEN=3|TO=6|SRC=SP4_TZPC_ADDR=0|FC=DISCONNECT|ZONES=0x4F|CRC1|CRC2

After splitter device 5 has successfully disconnected paging in its zone, it acknowledges the DISCONNECT message by sending a response containing the following bytes:
PRE|SOP|SEQ=12|LEN=3|TO=SP4_TZPC_ADDR=0|SRC=6|FC=DISCONNECT|ZONES=0x4F|CRC1|CRC2

DISCONNECT message 2
PRE|SOP|SEQ=13|LEN=3|TO=7|SRC=SP4_TZPC_ADDR=0|FC=DISCONNECT|ZONES=0x4F|CRC1|CRC2

After splitter device 2 has successfully disconnected paging in its zone, it acknowledges the DISCONNECT request by sending a response containing the following bytes:
PRE|SOP|SEQ=13|LEN=3|TO=SP4_TZPC_ADDR=0|SRC=2|FC=DISCONNECT|ZONES=0x4F|CRC1|CRC2

CONFIGURE Message

At the application level, the format of a CONFIGURE message is as follows:
a. Destination Address byte—unique virtual address of the slave splitter device;
b. Source Address byte—unique virtual address of the master telephone zone controller device i.e. zero;
c. Function Code byte—describes the function the slave should perform. In this case, to configure and setup the splitter in either a DAISY CHAIN or T-TAP network mode.

Example 1

When the network of splitters is discovered for the first time, the telephone zone controller sends a CONFIGURE request of the broadcast type, informing devices currently in t-tap network mode to change to daisy chain network mode.
PRE|SOP|SEQ=13|LEN=4|TO=ALL_DEVICES=0xFF|SRC=SP4_TZPC_ADDR=0|FC=CONFIGURE|MODE=DAISY_CHAIN=0|CRC1|CRC2

The Configure to Daisy Chain requires no response or acknowledgement be sent back to the telephone zone controller.

Example 2

After the network of splitters have been discovered and registered, the telephone zone controller sends a CONFIGURE request of the t-tap type, informing devices currently in daisy chain network mode to change to the t-tap mode of network operation.
PRE|SOP|SEQ=13|LEN=4|TO=1|SRC=SP4_TZPC_ADDR=0|FC=CONFIGURE|MODE=T_TAP=1|CRC1|CRC2

The splitter reverts to the t-tap mode and sends the following acknowledgement back to the telephone zone controller:
PRE|SOP|SEQ=13|LEN=3|TO=SP4_TZPC_ADDR=0|SRC=1|FC=CONFIGURE|CRC1|CRC2

In one embodiment, the telephone zone controller's interface with the EVES is implemented in hardware. Its function is to output line level audio from either its Background Music input source or from its telephone paging port.

The telephone zone controller's Background Music source is also implemented in hardware. Its sole function is to receive audio from a music source.

Similarly, the telephone zone controller's telephone audio in interface is implemented in hardware. Its sole function is to receive audio from a telephone source.

Figure 3:
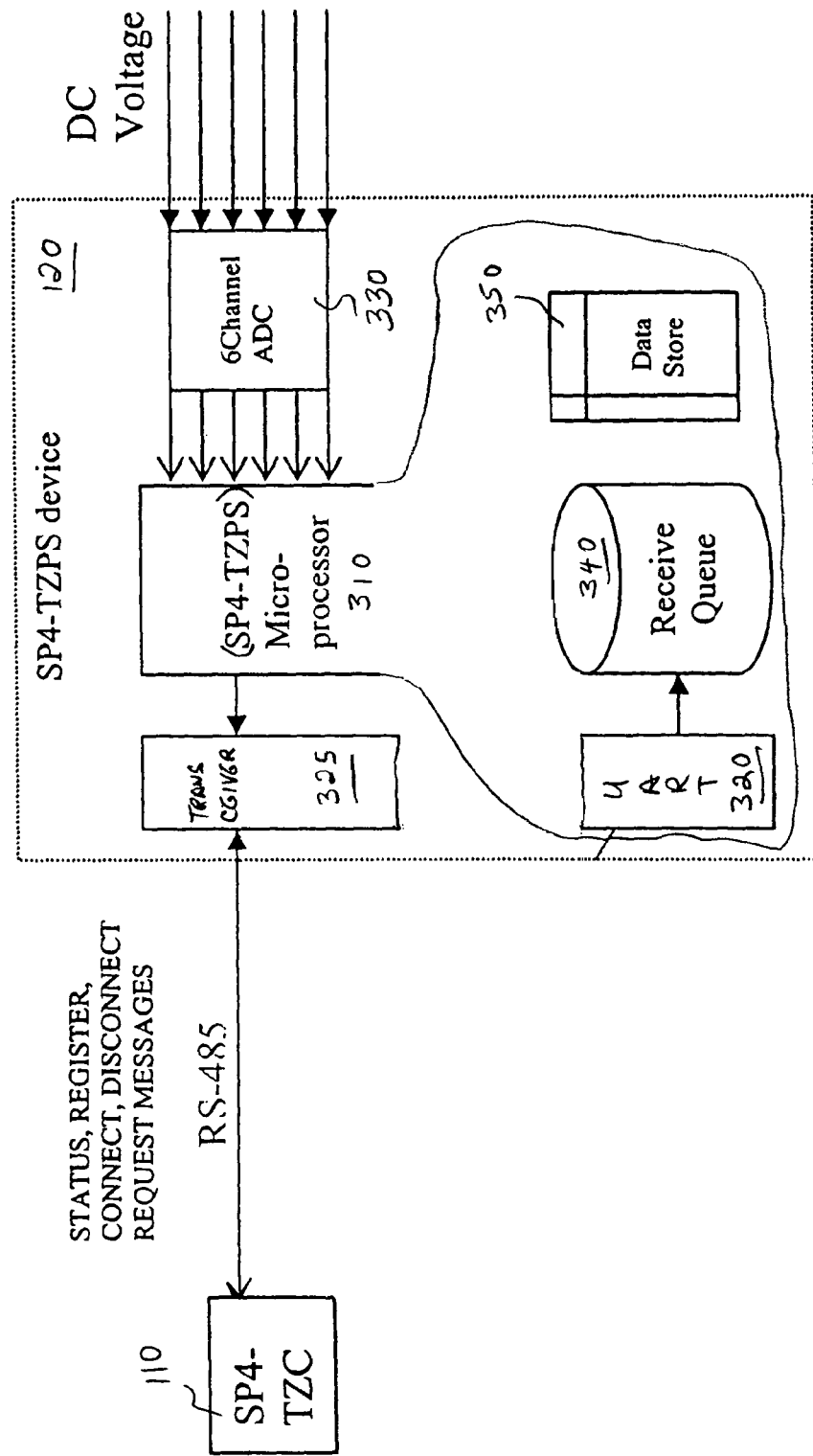
FIG. 3 is a block diagram of an exemplary addressable splitter of the present invention.
Figure 5:
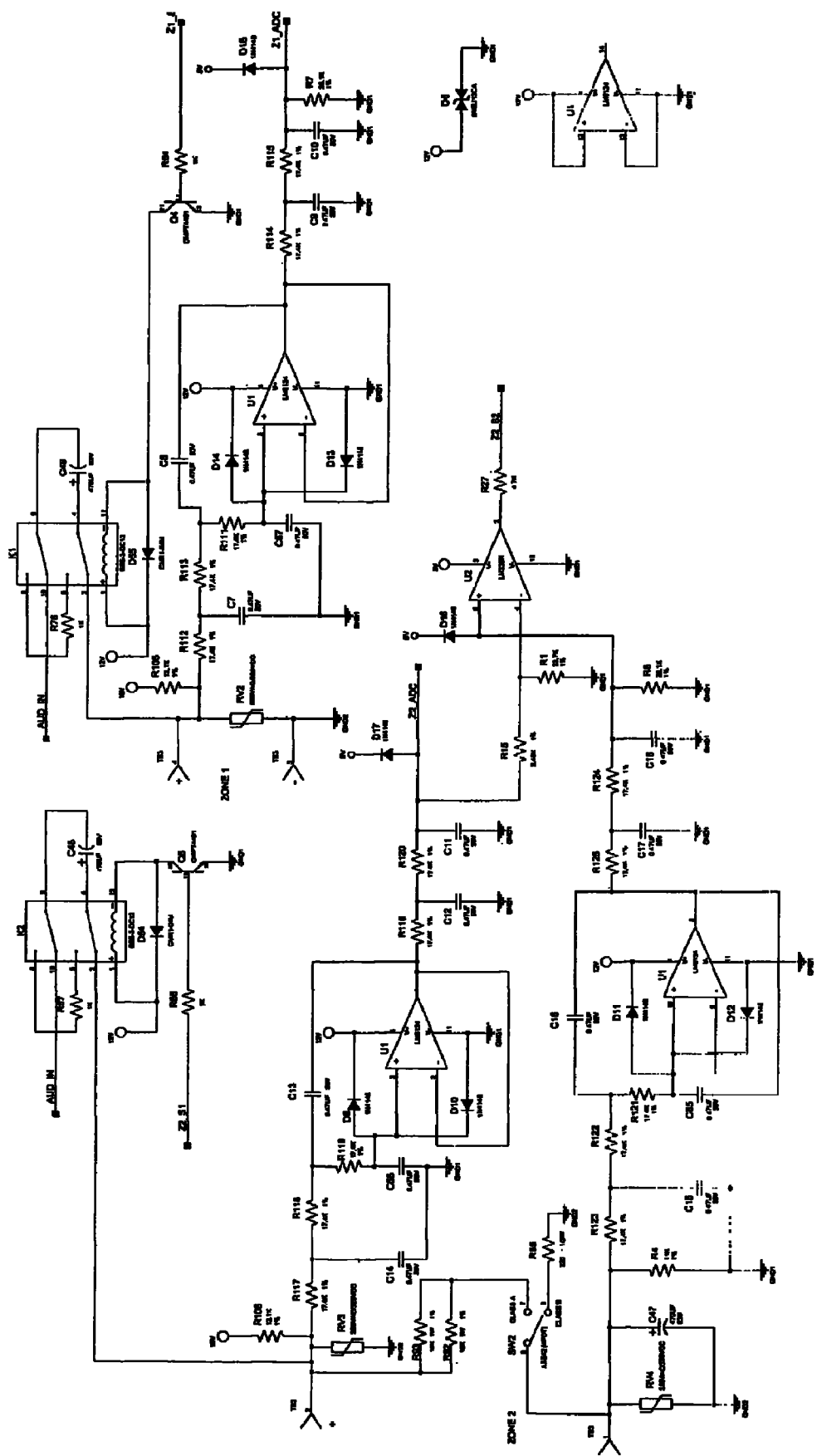
FIG. 5 is a schematic diagram of one embodiment of the present splitter showing the zone 1 and zone 2 outputs.
Figure 6:
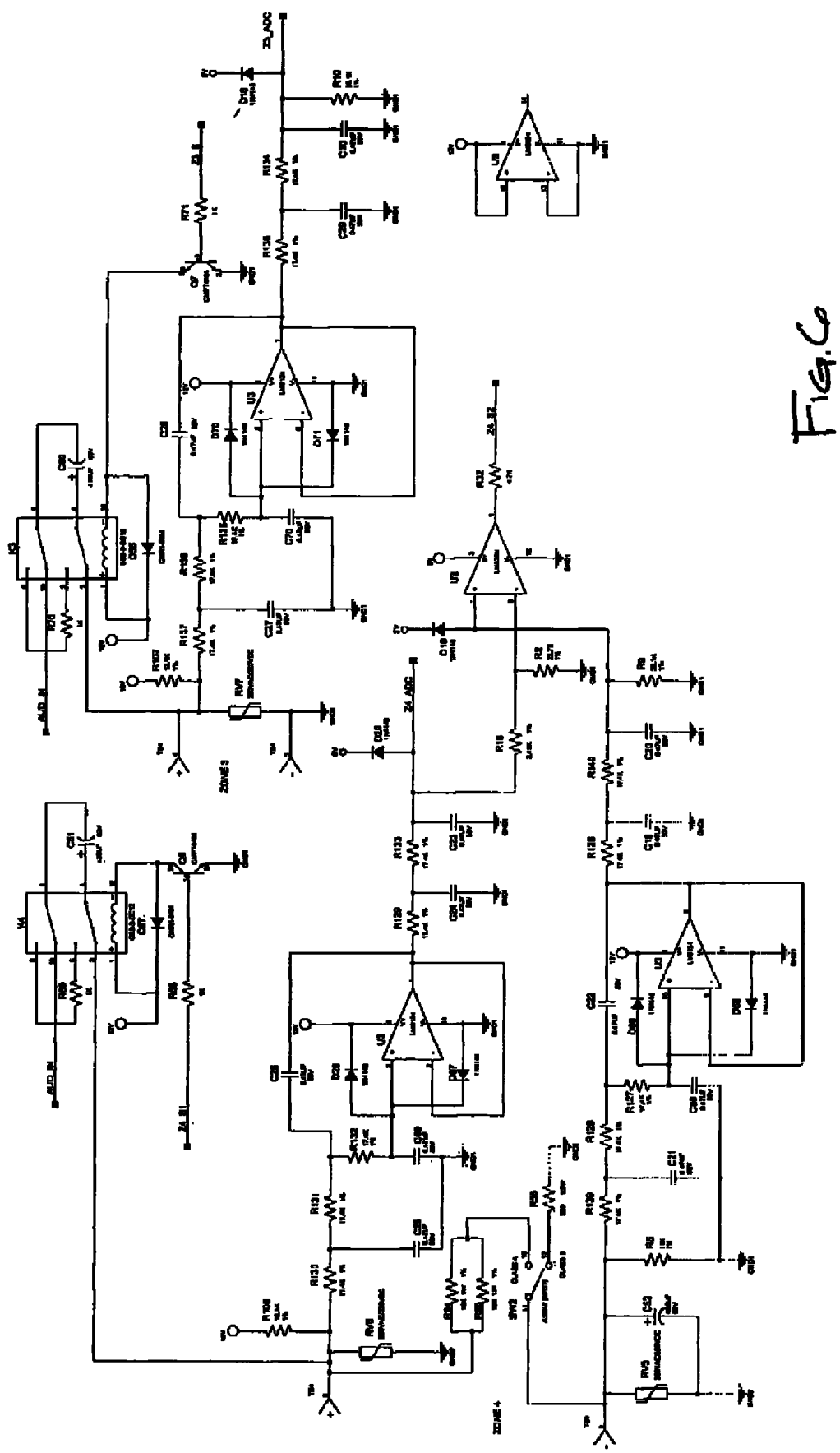
FIG. 6 is a schematic diagram of one embodiment of the present splitter showing the zone 3 and zone 4 outputs.
Figure 7:
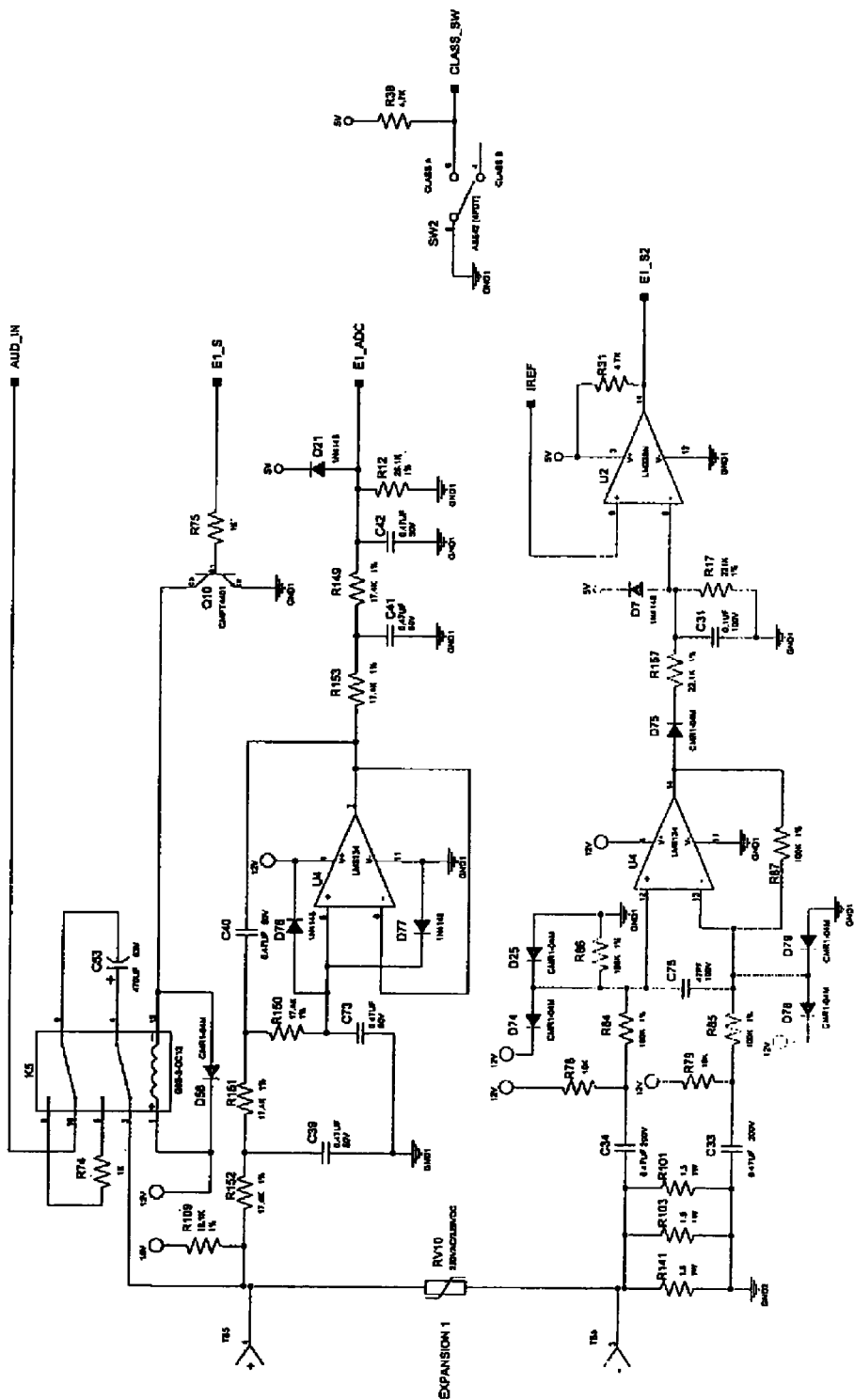
FIG. 7 is a schematic diagram of one embodiment of the present splitter showing the expansion 1 outputs.
Figure 8:
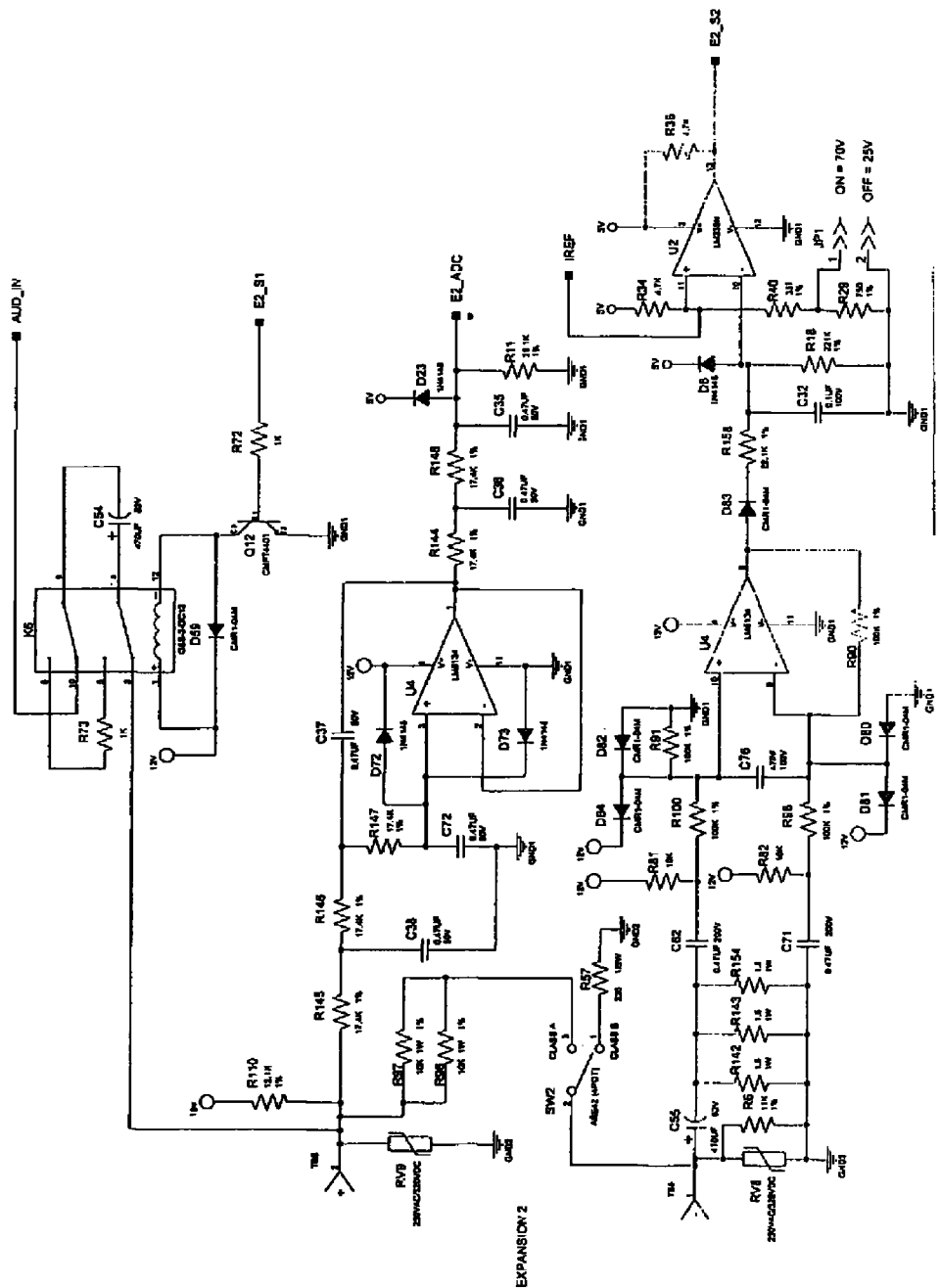
FIG. 8 is a schematic diagram of one embodiment of the present splitter showing the expansion 2 outputs.
Figure 9:
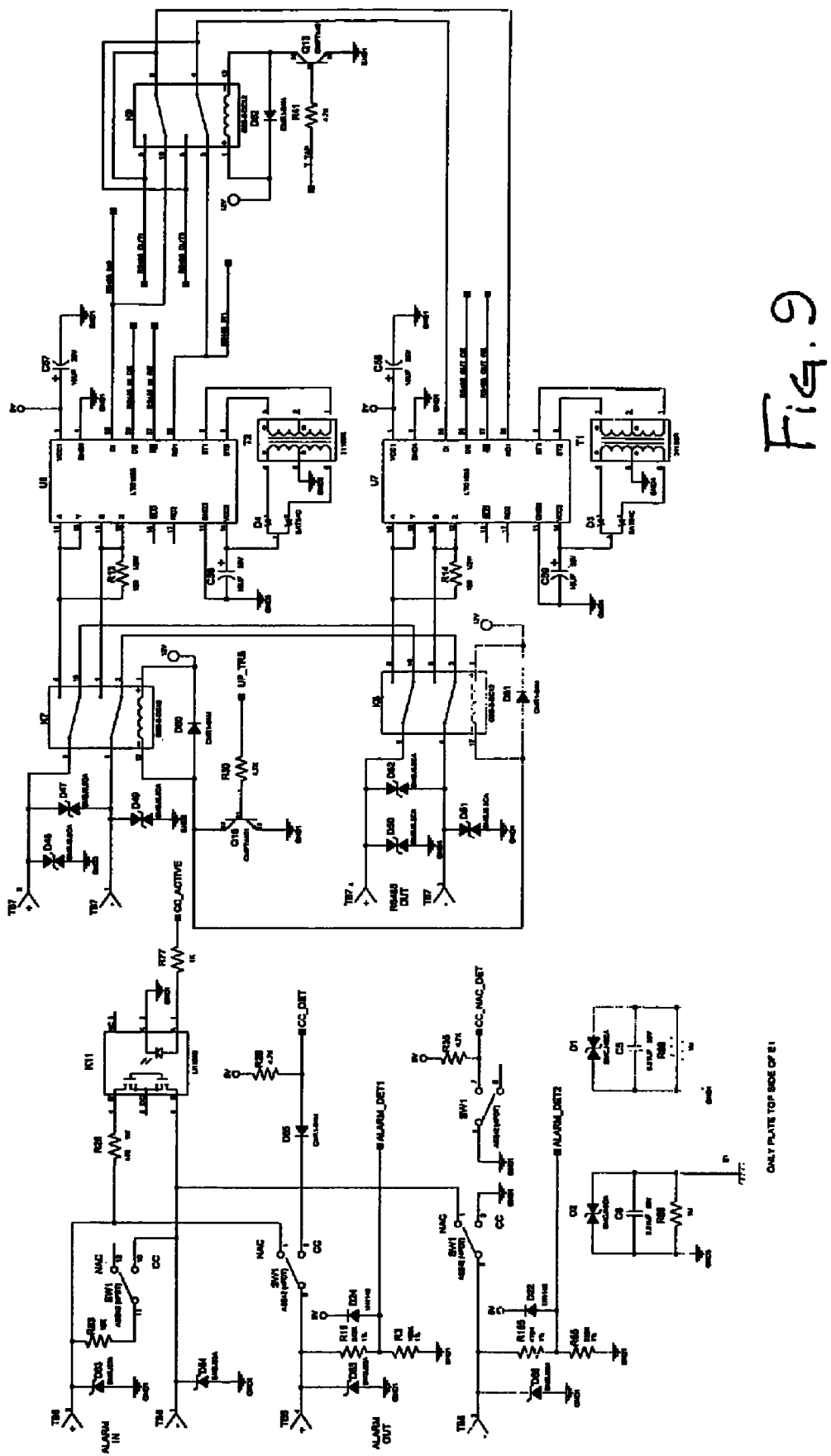
FIG. 9 is a schematic diagram of one embodiment of the present splitter showing the alarm in/out RS485 circuits.
Figure 10:
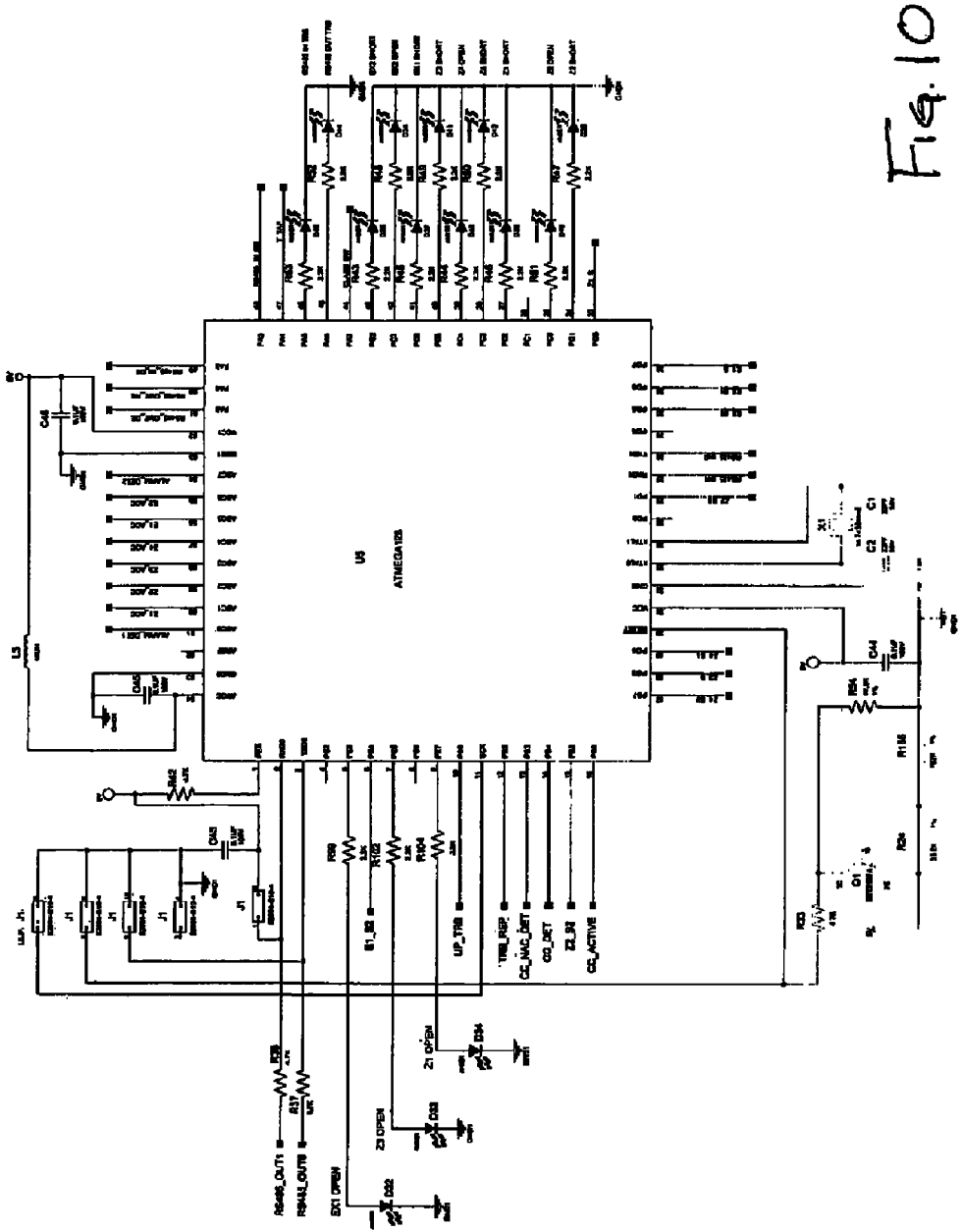
FIG. 10 is a schematic diagram of one embodiment of the present splitter showing the micro circuit.
Figure 11:
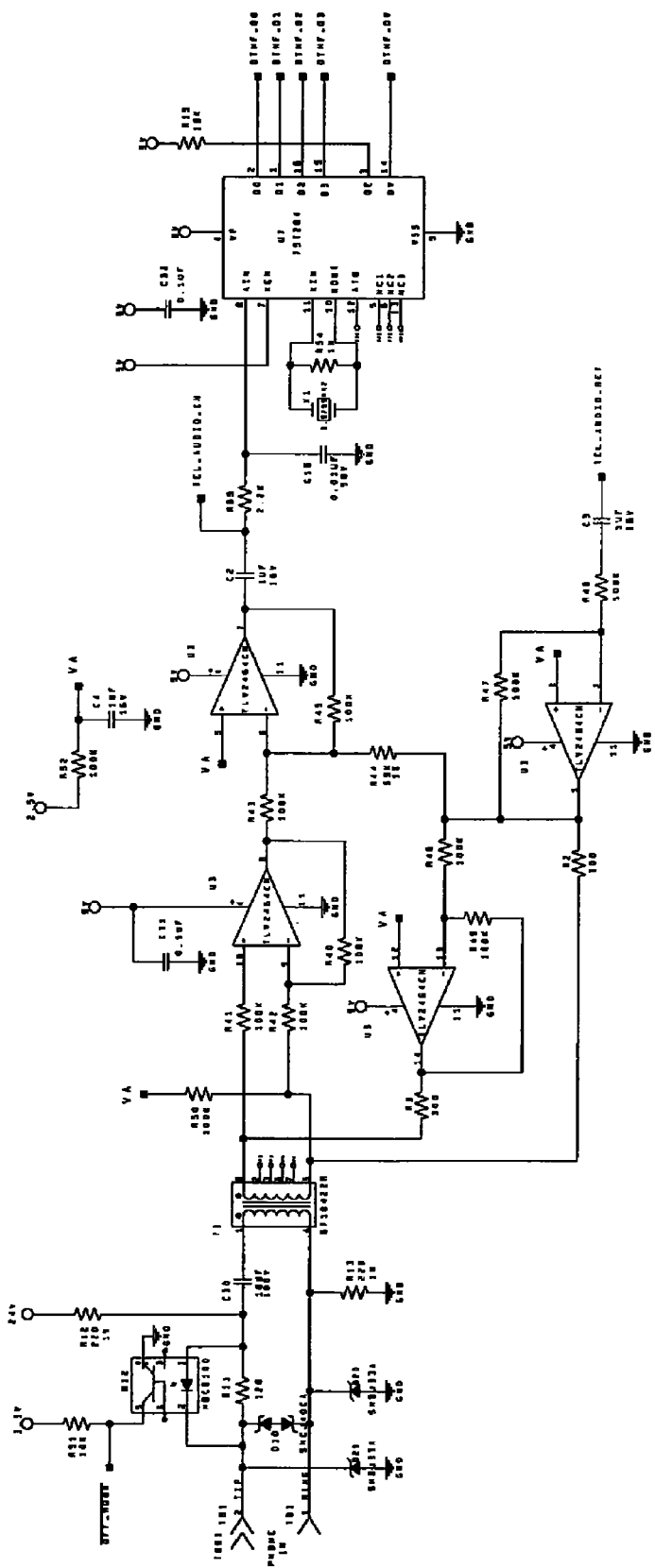
FIG. 11 is a schematic diagram of one aspect of one embodiment of the present telephone zone controller.
Figure 12:
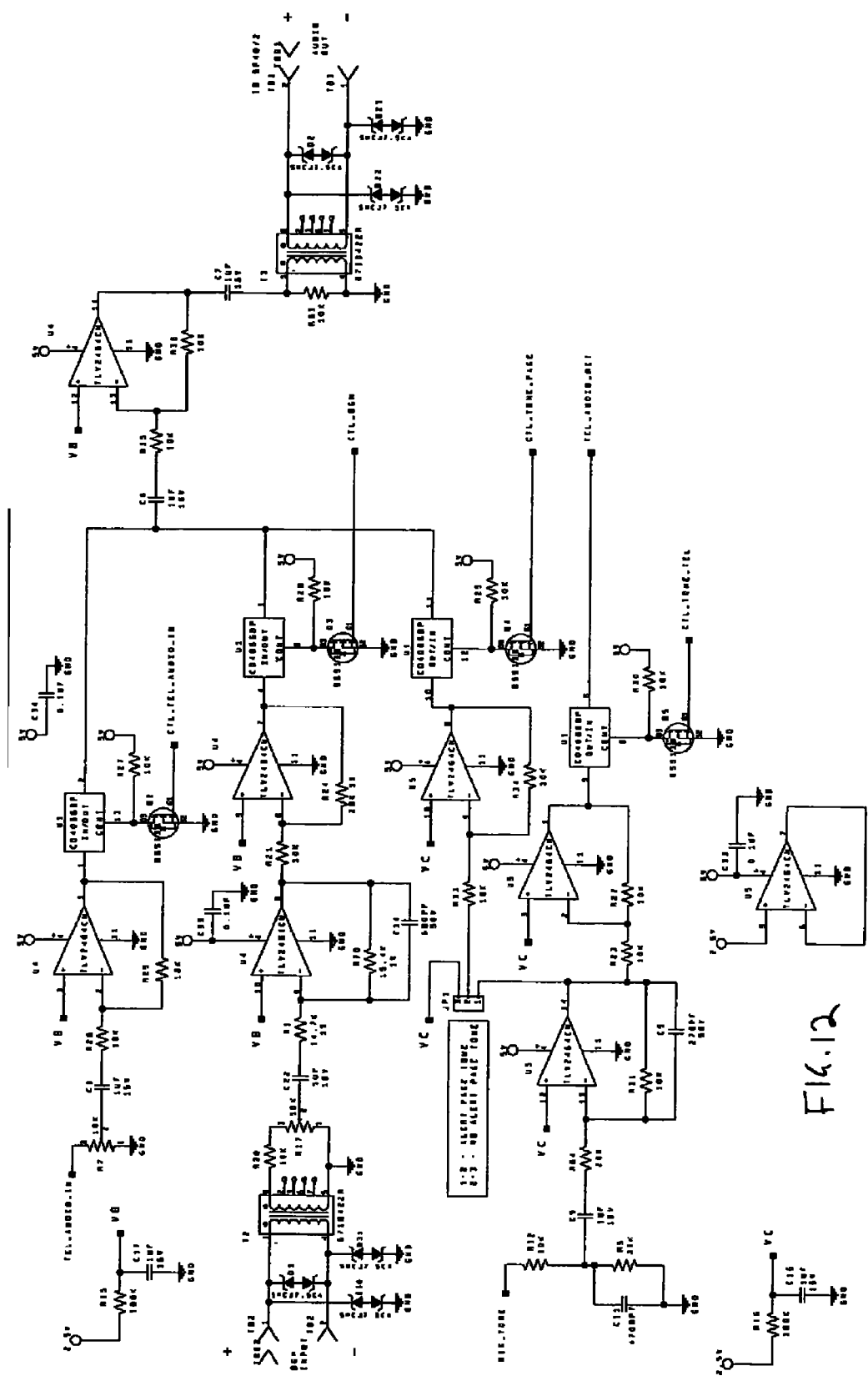
FIG. 12 is a schematic diagram of one aspect of one embodiment of the present telephone zone controller.
Figure 13:
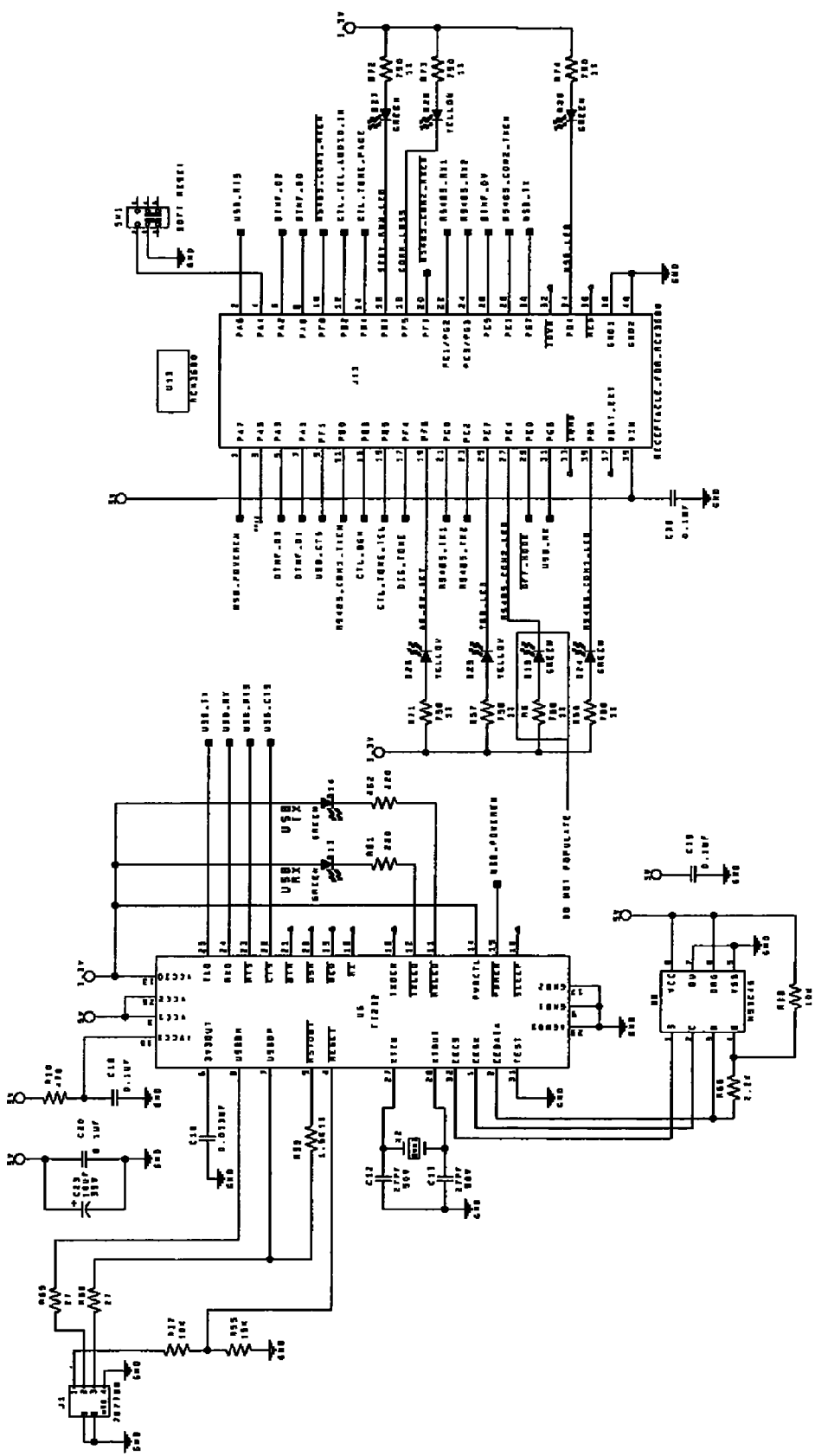
FIG. 13 is a schematic diagram of one aspect of one embodiment of the present telephone zone controller.
Figure 15:
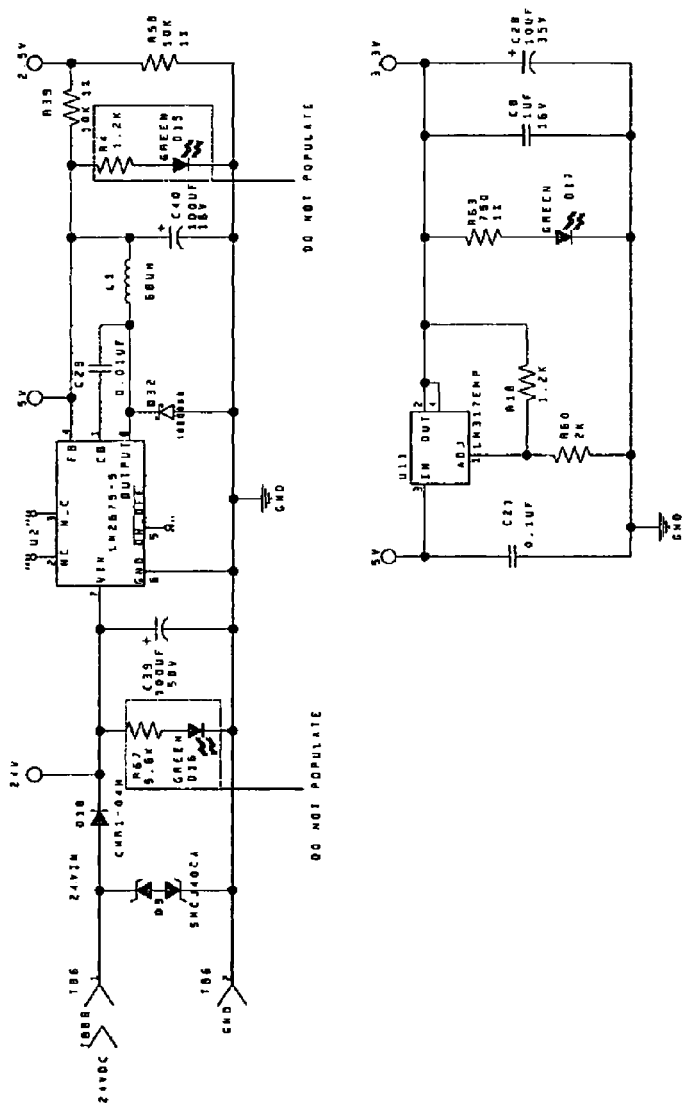
FIG. 15 is a schematic diagram of one aspect of one embodiment of the present telephone zone controller.

FIG. 3 is a block diagram of an exemplary addressable splitter 120 of the present invention. In one embodiment, the Telephone Zone Paging Splitter (TZPS) 120 is an addressable device that splits an audio signal up to four ways, i.e., supporting up to four zones. Namely, each splitter is capable of controlling audio for two zones in Class A mode or four zones in Class B mode of operation. In one exemplary embodiment, the splitter outputs up to 40 Watts of supervised audio at 25 V or 70V per zone.

The addressable splitter 120 communicates with the telephone zone controller 110 via half-duplex serial communications and adheres to the RS485 standard for serial transmissions. It uses a Master/Slave communications packet protocol designed to reliably receive and send data over a serial link.

In one embodiment, as input, the splitter 120 takes in 25V or 70V audio from an emergency voice evacuation system (EVES), e.g., a SP40/2 system from Wheeleck. The splitter also takes in alarm contacts from the emergency voice evacuation system. Any microphone (on-board or remote) or emergency messages shall override any pre-selection of zones and have priority over telephone paging.

In one embodiment, the splitter listens on the line for digital control messages addressed to it. When it receives a message, the splitter processes it, and if it happens to be a telephone paging connect request to one or more (up to four of its) zones, it routes the audio down the appropriate channels such that only required zones are paged. Subsequently when it receives a disconnect telephone paging request, it disconnects routing of audio through those channels. The addressable splitter also listens for a periodic heartbeat from the telephone zone controller 110 and responds by sending status information regarding its health and audio channel integrity. In one embodiment, when the splitter 120 fails to receive a heartbeat from the telephone zone controller, it lights up its trouble LED indicating that it has detected a trouble condition whereby it cannot communicate with its controller.

In one embodiment, the splitter 120 also supervises the four audio channels, two audio expansion channels, and two alarm contacts for wire troubles such as open, minor shorts, and major shorts, and reports trouble signals detected via separate trouble LEDs.

In one embodiment, the splitter 120 comprises the following hardware components:
  a. Micro-processor 310—utilizes two serial ports.
  b. RS485 transceiver 325—Transmits and receives data bytes via RS485 serial transmission protocol.
  c. ADC 330—Analog to Digital Converter. Provides supervision of 6 audio zones by reading voltages on each audio channel.

In one embodiment, the splitter's firmware components comprise the following software components:
  a. Receive Queue 340—First-In First-Out (FIFO) buffer that receives and stores incoming messages addressed to the splitter.
  b. UART 320—Software UART operating at a baud rate, e.g., of 19,200 bits per second. Allows Processor to send and receive bytes, one byte at a time.
  c. Processor 310—Services the six ADC channels for trouble conditions. Receives command requests addressed to it via its Receive Queue, and transmits command responses to the telephone zone controller.
  d. Data Store 350—Data stored in non-volatile memory e.g. unique virtual address.

The splitter 120 receives command requests from the telephone zone controller 110 addressed to it via its UART and Receive Queue. The following command requests are supported.

Status message: When a splitter receives a Status message, it updates its internal data structures to reflect that it has witnessed a heartbeat from the telephone zone controller, and responds providing its status. The splitter reports the following information to the telephone zone controller:
  1. Normal—the splitter is in a healthy operational state, free from troubles.
  2. Open—An open trouble condition has been detected on an audio channel
  3. Minor Short—A minor short trouble condition has been detected
  4. Major Short—A major short trouble condition has been detected Register Messages: Upon first-time initialization, the splitter comes up in its Daisy Chain network mode as an un-addressed device, and waits to receive registration data from the splitter. When a splitter receives a Register message in the Daisy Chain network mode it assigns itself the virtual address contained in the message, and sends a response message to the telephone zone controller indicating the class that it is in i.e. Class A or B Connect Messages: When the splitter receives this message it connect to one or more or all (four) zones of a splitter, so telephone paging in those particular zones is active.

Disconnect Messages: When the splitter receives this message it disconnects zone paging.

Trouble Messages: If the telephone zone controller 110 has detected a trouble condition with a splitter, the telephone zone controller will send the device a trouble message. Included in the trouble message is an error code, that instructs the splitter to perform a certain function. The following is an example of an error code:

INVALID_CLASS—A problem has been detected with the splitter's class mode of operation In one embodiment, the splitter's microprocessor monitors the voltages across the six Analog-to-Digital channels to check for troubles. Refer to the following table 1 for details:

TABLE 1

| Voltage | Description | Indicators |
|---|---|---|
| 5 V | Open trouble | Six LEDs, one per zone. Lighted LED(s) indicates trouble condition on line. |
| 4 V | Normal. No trouble. | LED(s) not lit. |
| 3 V | Minor short | Six LEDs, one per zone. Lighted LED indicates trouble condition on line. |
| Less than 2 V | Major short | In addition to the same six LED(s) used to indicate a minor short, there are six relays, one per zone. |

FIGS. 4-10 illustrate the various embodiments of the addressable splitter of the present invention. FIGS. 11-15 illustrate the various embodiments of the telephone zone controller of the present invention.

The SP4 Telzone Programmer Design Document (DD) (see appendix) details the different messages that are implemented for communication purposes. The main three types of messages are: Command messages, Query messages, and Debug messages. Command messages are used for e.g. to program the Logical Zone Groups and background Music Zone, while query messages are used to query the device (TZC) to obtain Logical Zone Group and Background Music zone data. See Appendix below for detailed info regarding these types of messages.

It should be noted that the present disclosure provides various numerical values that are only exemplary. Those skilled in the art will realize that other values may be applicable and thus, these exemplary values should not be viewed as a limitation of the present invention.

While the foregoing is directed to embodiments of the present invention, other and further embodiments of the invention may be devised without departing from the basic scope thereof, and the scope thereof is determined by the claims that follow.

What is claimed is:

1. A notification system, comprising:
  a telephone zone controller; and
  at least one addressable splitter for communication with said telephone zone controller and for routing a received audio signal to at least one zone supported by said at least one addressable splitter, wherein the at least one addressable splitter comprises a plurality of addressable splitters that are each assigned a virtual address and a non-broadcast command is issued to one or more of the plurality of addressable splitters via a respective virtual address.

2. The notification system of claim 1, wherein said telephone zone controller and said at least one addressable splitter are in a master/slave configuration.

3. The notification system of claim 1, wherein said at least one addressable splitter supports a plurality of zones, wherein each one of said plurality of zones comprises one or more notification appliances.

4. The notification system of claim 3, wherein said one or more notification appliances comprise at least one of: an audible notification appliance or a visible notification appliance.

5. The notification system of claim 1, wherein at least one addressable splitter comprises a plurality of addressable splitters deployed in a daisy chain configuration.

6. The notification system of claim 1, wherein said at least one addressable splitter controls a plurality of different zones.

7. The notification system of claim 1, further comprising:
a multi-function emergency voice evacuation system for receiving an audio signal from said telephone zone controller, for amplifying said audio signal to provide said received audio signal, and for forwarding said received audio signal to said at least one addressable splitter.

8. The notification system of claim 1, further comprising:
one or more audio boosters in communication with said at least one addressable splitter.

9. A method for providing one or more addressable functions in a notification system, comprising:
providing a telephone zone controller; and
providing at least one addressable splitter for communication with said telephone zone controller and for routing a received audio signal to at least one zone supported by said at least one addressable splitter; and
issuing at least one of: a broadcast command or a non-broadcast command to said at least one addressable splitter, wherein said issuing said non-broadcast command comprises:
assigning a virtual address to each one of a plurality of addressable splitters; and
issuing said non-broadcast command to one or more of said plurality of addressable splitters via a respective virtual address.

10. The method of claim 9, comprising:
configuring said telephone zone controller and said at least one addressable splitter in a master/slave configuration.

11. The method of claim 9, wherein said broadcast command is issued to each one of said at least one addressable splitter.

12. The method of claim 9, further comprising:
initializing said notification system, wherein initializing comprises:
powering up each one of said at least one splitter first;
powering up said telephone zone controller; and
transmitting at least one configuration message from said telephone zone controller to each one of said at least one splitter.

13. The method of claim 9, further comprising:
receiving a received audio signal at said at least one addressable splitter;
splitting said received audio signal into a plurality of audio signals at said at least one addressable splitter, wherein each one of said plurality of audio signals is intended for a respective zone of a plurality of zones controlled by said at least one addressable splitter; and
routing said plurality of audio signals to said respective zone via said at least one addressable splitter.

14. The method of claim 9, further comprising:
periodically transmitting a heartbeat signal from said telephone zone controller to said at least one addressable splitter; and
transmitting status information from said at least one addressable splitter to said telephone zone controller in response to said heartbeat signal.

15. A notification system, comprising:
a telephone zone controller;
at least one addressable splitter for communication with said telephone zone controller and for routing a received audio signal to at least one zone supported by said at least one addressable splitter, wherein the at least one addressable splitter comprises a plurality of addressable splitters that are each assigned a virtual address and a non-broadcast command is issued to one or more of the plurality of addressable splitters via a respective virtual address; and
at least one computer in communication with said telephone zone controller.

16. The notification system of claim 15, wherein said computer provides an interface for programming one or more logical zones.

17. The notification system of claim 15, wherein said computer provides an interface for programming one or more background music zones.

18. The notification system of claim 15, wherein said computer provides a graphical user interface (GUI).

* * * * *